(12) United States Patent
Weh et al.

(10) Patent No.: US 9,651,182 B2
(45) Date of Patent: May 16, 2017

(54) QUICK-ACTING CONNECTION

(76) Inventors: Erwin Weh, Illertissen (DE); Wolfgang Weh, Illertissen (DE)

( * ) Notice: Subject to any disclaimer, the term of this patent is extended or adjusted under 35 U.S.C. 154(b) by 226 days.

(21) Appl. No.: 13/807,448

(22) PCT Filed: Jun. 29, 2011

(86) PCT No.: PCT/EP2011/003194
§ 371 (c)(1),
(2), (4) Date: Dec. 28, 2012

(87) PCT Pub. No.: WO2012/000659
PCT Pub. Date: Jan. 5, 2012

(65) Prior Publication Data
US 2013/0099483 A1 Apr. 25, 2013

(30) Foreign Application Priority Data
Jun. 30, 2010 (DE) .................... 10 2010 025 747

(51) Int. Cl.
*F16L 37/18* (2006.01)
*F16L 37/38* (2006.01)

(52) U.S. Cl.
CPC ............. *F16L 37/18* (2013.01); *F16L 37/38* (2013.01)

(58) Field of Classification Search
CPC ......... F16L 37/18; F16L 37/38; F16L 29/007; F16L 37/28; F16L 37/0841; F16L 21/08
USPC ........ 285/314, 311, 35, 82, 312, 322, 87, 88
See application file for complete search history.

(56) References Cited

U.S. PATENT DOCUMENTS

| 191,481 | A | 5/1877 | Scoville |
| 1,099,389 | A | 6/1914 | Morrison |
| 1,394,022 | A | 10/1921 | Jones |
| 1,840,904 | A | 1/1932 | Julien |
| 2,060,748 | A | 11/1936 | Hardy et al. |
| 2,896,663 | A | 7/1959 | Mena |

(Continued)

FOREIGN PATENT DOCUMENTS

| AU | 2009100267 | 4/2009 |
| DE | 297 11 841 U1 | 8/1998 |

(Continued)

OTHER PUBLICATIONS

International Search Report for PCT/EP2011/003194, dated Nov. 2011.

(Continued)

*Primary Examiner* — Gregory Binda
*Assistant Examiner* — Zachary Dragicevich
(74) *Attorney, Agent, or Firm* — Knobbe Martens Olson & Bear LLP

(57) ABSTRACT

In order to create a quick-acting connection which is secure and subject to low levels of wear, in particular for the purpose of filling gas cylinders, having a housing (1), having an inlet (2) and an outlet (3) for medium which is to be transferred, and having a quick-acting-connection device (4), in particular with collet chucks (5), provided in the region of the outlet (3), and having an actuating means (7), which engages in a recess (8') of a sliding sleeve (8) by means of an eccentric disk (12), it is proposed that the recess (8') contains a sliding block (9), to which the eccentric disk is eccentrically coupled and which, when the actuating means (7) is pivoted, can be displaced transversely to the longitudinal axis.

11 Claims, 1 Drawing Sheet

(56) References Cited

U.S. PATENT DOCUMENTS

| | | | |
|---|---|---|---|
| 2,943,639 A | | 7/1960 | Smith |
| 2,959,188 A | | 11/1960 | Kepner |
| 3,498,324 A | | 3/1970 | Breuning |
| 3,523,553 A | | 8/1970 | Beck et al. |
| 3,710,823 A | * | 1/1973 | Vik ............... 137/594 |
| 3,738,688 A | * | 6/1973 | Racine ............. 285/312 |
| 4,288,112 A | | 9/1981 | Stoll |
| 4,470,575 A | | 9/1984 | Stoll |
| 4,474,208 A | | 10/1984 | Looney |
| 4,540,201 A | * | 9/1985 | Richardson ........ F16L 37/101 285/101 |
| 4,552,336 A | | 11/1985 | Pastrone |
| 4,896,698 A | * | 1/1990 | Limiroli ............. 137/614 |
| 5,060,982 A | | 10/1991 | Matsushita |
| 5,113,900 A | | 5/1992 | Gilbert |
| 5,167,398 A | | 12/1992 | Wade |
| 5,265,844 A | | 11/1993 | Westfall |
| 5,575,510 A | | 11/1996 | Weh |
| 5,749,394 A | | 5/1998 | Boehmer et al. |
| 6,095,186 A | | 8/2000 | Nagel |
| 6,189,862 B1 | | 2/2001 | McKay |
| 6,658,990 B1 | | 12/2003 | Henning et al. |
| 6,719,003 B2 | | 4/2004 | Schroeder et al. |
| 8,844,979 B2 | * | 9/2014 | Danielson ........ F16L 37/1215 137/798 |
| 8,875,734 B2 | | 11/2014 | Weh et al. |
| 2002/0036015 A1 | | 3/2002 | Miyajima et al. |
| 2006/0021659 A1 | | 2/2006 | Andersson |
| 2007/0052232 A1 | | 3/2007 | Gunderson |
| 2008/0018059 A1 | | 1/2008 | Otuka |
| 2008/0190489 A1 | * | 8/2008 | Wrubel ............ F16L 37/1215 137/231 |
| 2009/0267014 A1 | | 10/2009 | Ishitoya et al. |
| 2010/0288961 A1 | | 11/2010 | Weh |

FOREIGN PATENT DOCUMENTS

| | | |
|---|---|---|
| DE | 20 2007 010788 U1 | 9/2008 |
| EP | 1271039 A | 1/2003 |
| EP | 1577598 | 9/2005 |
| FR | 2686680 | 7/1993 |
| WO | WO 00/52378 | 9/2000 |
| WO | WO 2012/000659 | 1/2012 |
| WO | WO 2012/003927 | 1/2012 |

OTHER PUBLICATIONS

International Search Report and Written Opinion dated Jan. 7, 2010 for International Application No. PCT/EP2008/006359 (U.S. Appl. No. 12/671,673).

International Preliminary Report on Patentability dated Feb. 2, 2010 for International Application No. PCT/EP2008/006359 (U.S. Appl. No. 12/671,673).

International Preliminary Report on Patentability dated Jan. 8, 2013 for PCT Application No. PCT/EP2011/003194 (U.S. Appl. No. 13/807,448).

International Search Report and Written Opinion dated Nov. 25, 2011, for PCT Application No. PCT/EP2011/003027 (U.S. Appl. No. 13/808,376).

International Preliminary Report on Patentability dated Jan. 8, 2013 for PCT Application No. PCT/EP2011/003027 (U.S. Appl. No. 13/808,376).

* cited by examiner

QUICK-ACTING CONNECTION

BACKGROUND OF THE INVENTION

Field of the Invention

The invention relates to a quick connection, in particular for filling of gas cylinders.

Description of the Related Art

Such a quick connection is known from U.S. Pat. No. 5,575,510 of the applicant. Here, a simple-to-use and secure quick-connect coupling is described, which is especially used for filling gas cylinders. in such gas cylinders more and more valves are used with higher spring forces, so that the compression springs for generating a bias in the quick-connect coupling can be increased in order to allow an easy shut-off. However, the mechanism is urged with a stronger force, in particular the actuating device having a control disc. As it is rotated in a frame of about 90°, multiple line contacts occur, so that the control disc and the frame at high spring forces are subject to increased wear and thus can be hard to move.

SUMMARY OF THE INVENTION

Thus, the invention is based on the object of providing a quick connection of the type mentioned above, which enables a safe and reliable quick connection, in particular at lass wear.

This object is achieved by a quick connection, in particular for filling gas bottles, with the features of patent claim 1. Preferred embodiments of the invention are set forth in the dependent claims.

The quick connection is preferably provided with a collet to couple different profiles, such as female, male, grooves and the like fit. The collet profile is designed complementary to an engagement profile, for example a nozzle or gas cylinder valve connection threads. The design of the inventive quick connection is simplified by the fact that the sliding sleeve is in direct communication to the sealing piston. Thus, in an advantageous manner it is sufficient for the actuation of the quick connector that only the sliding sleeve is moved relative to the housing, without a direct engagement of the actuator required to the sealing piston. The sliding sleeve is preferably connected to the sealing piston in relative moveability in order to permit an optimal sealing of the sealing piston. For this purpose, bolts are provided between the sliding sleeve and the sealing piston such that a particularly simple assembly is achieved. The sealing piston is also preferably biased toward the outlet, such that optimum sealing conditions in the terminal area can be realized by an additional system pressure. As a counter pressure for such enhanced gas cylinder valves stronger springs can be used, wherein the surface pressure is reduced by the use of such inventive sliding blocks, so that the wear is significantly lowered. Thus, a highly durable and smooth coupling is created.

Preferably, the actuating means is formed as a housing-mounted pivot lever, in particular in the form of a bracket to be pivoted over the range of the gas bottle valve. This results in easy handling on connection to gas cylinders, since the bracket can be handled on both sides. The bracket can also be formed in the manner of a bent pivot lever. The pivot lever is mounted on the housing's longitudinal axis and can be moved from an open position which is approximately perpendicular to the longitudinal axis, around 90° to a closed position. This pivoting movement with a simultaneous sliding movement of the sliding sleeve provides a uniform force transmission, especially when the pivot bracket is mounted on both sides of the housing and having an eccentric disk which is used for transmission of movement to the sliding sleeve. For this purpose the eccentric disk engages via the sliding blocks in a recess of the sliding sleeve, such that an extremely compact and smooth design of the motion transfer is achieved, which also allows a reduced surface pressure and high durability.

The respective sliding block can be moved in the recess e.g. 15 mm up or down, also providing a stable limiting stop. At the same time the positions of the open position or the closed position of the pivot lever are thus defined in a structurally simple manner. Further details and advantages of the invention will become apparent from the description of a preferred embodiment of the invention with reference to the drawings.

DETAILED DESCRIPTION OF THE PREFERRED EMBODIMENTS

Figure 1:
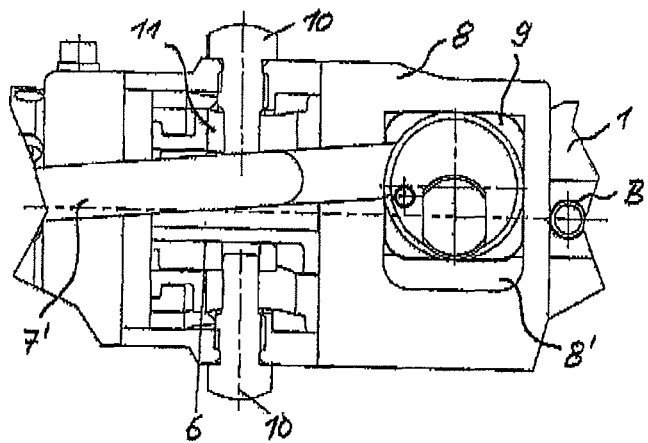
FIG. 1 a side view of a quick connector (with sub-section) in connection position.

FIG. 1 shows a first embodiment of a quick connector according to the invention in the connection position with a connecting piece or a gas bottle valve (here not shown). The quick connection consists of a housing 1 having an inlet 2 and an outlet 3 (cf. FIG. 4) for passage of a medium through the housing 1, in particular gas. At the inlet 2, a tube or a hose is connected (not shown) for supplying the medium, in this case gas from a gas source. in the area of the outlet 3 a quick-connection device 4 is provided, which preferably consists of collets 5, a sealing piston 6 sliding in the housing 1 and an actuating device 7 in the form of a pivot lever 7'. A sliding sleeve 8 is guided on the cylindrical housing 1 and biased by a spring (not shown) in the direction to the outlet 3.

Figure 2:
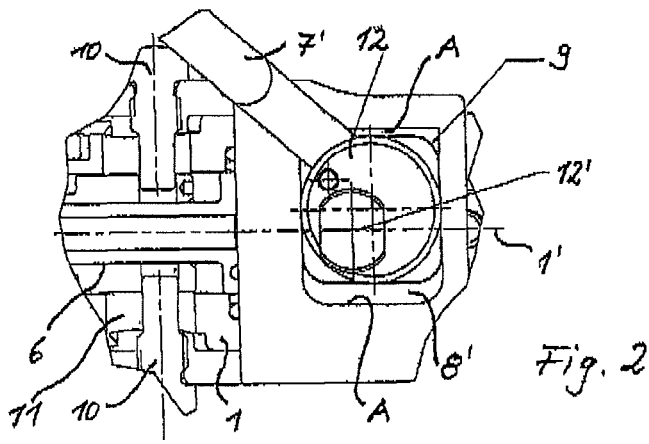
FIG. 2 a side view of the quick connector of FIG. 1, but in an intermediate position.
Figure 3:
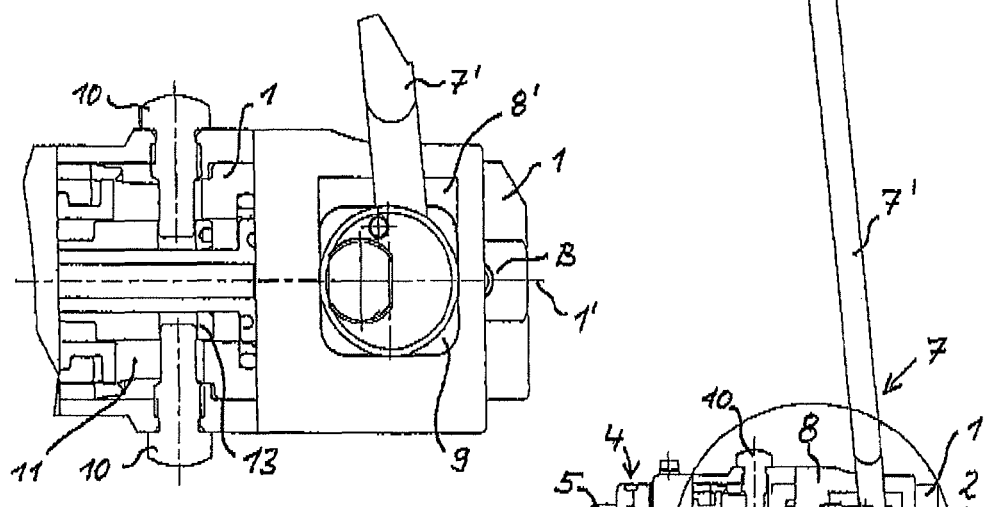
FIG. 3 a side view as in FIG. 1, but in the open position of the quick connector.

As shown in FIGS. 1 to 3 the sliding sleeve 8 includes screwed bolts 10 (in this case from the top and the bottom) passing through the housing 1 via slots 11, each being directed parallel to the longitudinal axis 1' of the housing 1. The bolts 10 engage with their respective end in a groove 13, which is parallel to the longitudinal axis 1' or to the aligned sealing piston 6. The sealing piston 6 is also provided with a spring (not shown) for biasing in the direction of the outlet 3 so that for opening of the quick connector considerable forces are acting on the pivot lever 7'. This structure generally corresponds to the above-mentioned US patent, as well as the assembly and operation of the collets 5 so that reference is made thereto.

For the displacement of the sliding sleeve 8, the actuating device 7 has a pivot lever 7', which is pivotally mounted at opposite sides of the housing 1 at the level of the longitudinal axis 1' and extends from the housing 1 to a circular arc connecting the halves to a bracket. The design of the lever or bracket is adapted to the dimensions of the quick connector. In the illustrated embodiment, the pivot bracket 7' permits pivoting around a gas cylinder valve port.

FIG. 3 shows the pivot lever 7' in an open position in which it is approximately perpendicular to the longitudinal axis 1' of the housing 1. From this position the pivot lever 7' can be pivoted to the position shown in FIG. 1, i.e. the connection position, whereas FIG. 2 shows an intermediate position of approximately 45° pivoting. Here in FIG. 2, the sliding block 9 is in the middle of a recess 8', being about 20% higher, so that in the terminal position of FIG. 1, the sliding block 9 strikes at the upper end and in the open position of FIG. 3 at the lower end, so that limiting stops A are formed and a further movement of the pivot lever 7' is prevented. Due to this orientation of the pivot lever in the connected position of FIG. 1 the outer end of the pivot lever 7' is below the longitudinal center plane and forms an acute angle therewith. This position provides an additional secure function, which includes the weight of the pivot lever or bracket 7'.

In the bearing region the pivot lever 7' is provided on each side with an eccentric disk 12 being eccentric to the longitudinal axis 1' (cf. FIGS. 1 and 2) and to mounting screws 12' and coupled to the sliding block 9 (being in this case approximately square-shaped). It is fitted into in the recess 8' (of rectangular shape), which is approximately higher than the sliding block 9 by the desired movement of the sliding sleeve 8. The design of the recess 8' is such that the eccentric disk 12 can rotate by about 90° and provides limiting stops for the open position (FIGS. 3 and 4) and the connecting position (FIG. 1).

Figure 4:
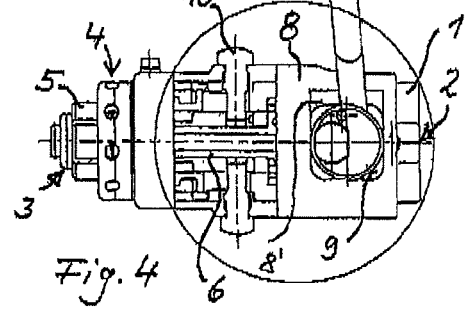
FIG. 4 an overall view of the quick connector as in FIG. 3 (=circular cut-out).

The function of the quick connector will be explained with reference to FIG. 4. in the open position shown in FIG. 4 (as well as in FIG. 3), the collets 5 are open for coupling to a connector, in particular a gas bottle. The pivot bracket 7' is then swung, and accordingly the sliding sleeve 8 is in its retracted position (here right). This is also evident from the comparison of FIGS. 1 to 3, in which a (right-side) bore B in the housing 1 is covered progressively. The bolts 10 are located in slots 11 at the rearmost position (right), and the sealing piston 6 contacts the bolts 10 by action of a spring. When the quick connector is then attached to a nozzle or to a threaded connection, this pushes the sealing piston 6 in the housing 1 until the collets 5 are located at the thread and securely engaged. The operator now holds the quick connection in the approach position and swings the pivot lever 7' to the position shown in FIG. 1. During this pivoting movement of the bracket or lever 7' the sliding sleeve 8 is pressed towards the outlet 3, here to the left, via the controlling engagement of the eccentric disk 12 and/or the sliding block 9 in the recess 8', such that the quick-connection device 4, particularly in the form of the collets 5, is locked. It should be understood that the spreading movement of the collets 5 for internal threads is opposite to that of outer profiles of gas cylinder valves. With internal threads a face seal may be provided for sealing contact with a sealing seat. in the described embodiment of the quick coupling the 90° pivoting provides an easy and reliable quick-connect coupling, especially for filling gas cylinders, wherein the wide contact surfaces of the sliding block ensure high durability and low wear even with high spring forces.

The invention claimed is:

1. A quick connection for filling gas bottles comprising:
   a housing having an inlet area and an outlet area for a medium to be transferred, the housing having a longitudinal axis extending in straight line from the inlet area to the outlet area; and
   a quick-connection device in the outlet area, the quick-connection device comprising collets and an actuating device engaging in a recess of a sliding sleeve, such that a sliding block provided in the recess can be displaced transversely in a direction that is perpendicular to the longitudinal axis on pivoting of the actuating device.

2. The quick connection according to claim 1, wherein the sliding sleeve is connected to a sealing piston, in an axial movable way, by one or more bolts.

3. The quick connection according to claim 2, wherein the one or more bolts are located between the sliding sleeve and the sealing piston and engage a groove.

4. The quick connection according to claim 3, wherein the sliding sleeve surrounds the housing and wherein the one or more bolts for coupling with the sealing piston pass through a slot in the housing.

5. The quick connection according to claim 1, wherein the actuating device comprises a pivot lever mounted on the housing in a symmetrical way on both sides of the housing and the longitudinal axis.

6. The quick connection according to claim 5, wherein the pivot lever is pivotable around 90° from an open position which is approximately perpendicular to the longitudinal axis to a connection position, in which the pivot lever is approximately parallel to the longitudinal axis.

7. The quick connection according to claim 6, wherein the pivot lever is coupled to the sliding block.

8. The quick connection according to claim 7, wherein the sliding block abuts a limiting stop in the recess when the pivot lever is in the open position.

9. The quick connection according to claim 1, wherein the sliding block is approximately square and fitted in a rectangular shaped recess with play, which is about an axial stroke of the sliding sleeve.

10. The quick connection according to claim 1, wherein the recess forms limiting stops for the sliding block.

11. The quick connection according to claim 1, wherein the inlet area is couplable to a tube or hose.

* * * * *